US010399163B2

(12) United States Patent
Hiraga

(10) Patent No.: US 10,399,163 B2
(45) Date of Patent: Sep. 3, 2019

(54) WIRE ELECTRIC DISCHARGE MACHINE

(71) Applicant: FANUC Corporation, Yamanashi (JP)

(72) Inventor: Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 124 days.

(21) Appl. No.: 15/381,624

(22) Filed: Dec. 16, 2016

(65) Prior Publication Data

US 2017/0173715 A1 Jun. 22, 2017

(30) Foreign Application Priority Data

Dec. 22, 2015 (JP) ................................ 2015-249428

(51) Int. Cl.

*B23H 1/02* (2006.01)
*B23H 7/20* (2006.01)
*B23H 7/06* (2006.01)
*G05B 19/4065* (2006.01)
*B23H 11/00* (2006.01)

(52) U.S. Cl.

CPC ................ *B23H 1/02* (2013.01); *B23H 7/06* (2013.01); *B23H 7/20* (2013.01); *B23H 11/00* (2013.01); *G05B 19/4065* (2013.01); *G05B 2219/45221* (2013.01); *G06T 2207/30164* (2013.01)

(58) Field of Classification Search

CPC . B23H 7/20; B23H 7/06; B23H 11/00; B23H 1/02; G05B 2219/45043; G05B 2219/45221; G05B 19/4065; G06T 2207/30164

See application file for complete search history.

(56) References Cited

U.S. PATENT DOCUMENTS 4,390,278 A * 6/1983 Inoue ................ G01B 11/2522 356/392
2012/0193326 A1 8/2012 Mitsuyasu
(Continued)

FOREIGN PATENT DOCUMENTS

CN 103600256 A 2/2014
CN 104339045 A 2/2015
(Continued)

OTHER PUBLICATIONS

Extended European Search Report in EP Application No. 16202862.5, dated May 18, 2017.
(Continued)

*Primary Examiner* — Geoffrey S Evans
(74) *Attorney, Agent, or Firm* — Hauptman Ham, LLP

(57) ABSTRACT

A core image acquiring unit is mounted at a position where the core image acquiring unit looks down at a workpiece on a table, such as an upper guide unit of a wire electric discharge machine, the core machining is performed, while fixing the core using a core fixing function, at a stage in which machining is completed to the end point of the machining path of cutting the core, the core and the workpiece are picked up by the core image acquiring unit, from the captured image, it is determined whether a machining groove has a constant width, or adhesion and deposition of machining debris are present in the machining groove, or the core is fixed by a difference in states of the surface light between the core and the workpiece.

9 Claims, 4 Drawing Sheets

(56) References Cited

U.S. PATENT DOCUMENTS

| | | | | |
|---|---|---|---|---|
| 2014/0014625 | A1 | 1/2014 | Yamaoka et al. | |
| 2014/0203000 | A1 | 7/2014 | Mitsuyasu et al. | |
| 2015/0352647 | A1 | 12/2015 | Abe et al. | |
| 2016/0239949 | A1 * | 8/2016 | Ogawa | G06K 9/6204 |
| 2016/0263688 | A1 * | 9/2016 | Hashimoto | B23H 1/022 |
| 2017/0185065 | A1 * | 6/2017 | Saito | G05B 19/402 |
| 2017/0282268 | A1 * | 10/2017 | Irie | B23H 7/02 |

FOREIGN PATENT DOCUMENTS

| | | | |
|---|---|---|---|
| JP | S57-96724 | A | 6/1982 |
| JP | 5-212621 | A | 8/1993 |
| JP | H6-79586 | A | 3/1994 |
| JP | 2001-255916 | A | 9/2001 |
| JP | 2012166332 | A | 9/2012 |
| JP | 2013144335 | A | 7/2013 |
| JP | 2014014907 | A | 1/2014 |
| JP | 2014024132 | A | 2/2014 |
| JP | 2015-229207 | A | 12/2015 |
| KR | 1996-0003211 | A | 3/1996 |
| KR | 10-2014-0146053 | A | 12/2014 |
| WO | 2015/092902 | A2 | 6/2015 |

OTHER PUBLICATIONS

Decision to Grant a Patent in JP Application No. 2015-249428, dated Dec. 19, 2017, 6 pp.

Office Action in CN Application No. 201611200417.8, dated Jul. 4, 2018, 15pp.

Office Action in KR Application No. 10-2016-0175495, dated Nov. 8, 2018, 10 pp.

* cited by examiner

WIRE ELECTRIC DISCHARGE MACHINE

RELATED APPLICATIONS

The present application claims priority to Japanese Patent Application Number 2015-249428, filed Dec. 22, 2015, the disclosure of which is hereby incorporated by reference herein in its entirety.

BACKGROUND OF THE INVENTION

1. Field of the Invention

The invention relates to a wire electric discharge machine, and particularly to a wire electric discharge machine that has a core fixing function of preventing the drop of the core when cutting out the core, by attaching and depositing machining debris to a workpiece and the core, in a part of a machining groove formed by electric discharge machining.

2. Description of the Related Art

In the wire electric discharge machine, a function (hereinafter, referred to as a core fixing function) of attaching and depositing (welding) the machining debris to the machining groove of the workpiece to fix the machined core to the workpiece, by utilizing a attachment phenomenon of the wire component to the workpiece has been known. As the core fixing function, a method of machining a large number of respective generated cores while fixing, and applying an external force to each of the fixed cores after completion of the whole machining to remove the cores from the workpiece has been taken. Since this method is efficient, its effect is exhibited in the machining in which the large number of the cores are generated.

For example, JP 2012-166332 A discloses an invention in which, when a machining shape is machined, in at least one position of the machining shape, instead of a welding cycle from a machining cycle of the electrical machining condition, a part of the wire electrode is melted, the workpiece and the cutout material are welded by a wire electrode melt to prevent detachment of the cutout material, and after completion of the electric discharge machining, the welded portion is destroyed by an external force to separate the cutout material from the workpiece. Further, JP 2014-24132 A discloses a method for editing a machining program for a wire electric discharge machine which analyzes the machining program, calculates a machining circumference length of a cutout machining member and an upper surface area of a shape of the machining member from the workpiece, calculates the mass of the machining member from the obtained machining circumference length, the upper surface area, the thickness of the workpiece and specific gravity, and obtains a length of the welding portion of the machining member to the obtained mass, by a map which stores a relation between the mass of the machining member and the length of the welding portion capable of holding the machining member.

Further, JP 2014-14907 A discloses a wire electric discharge machine and an automatic programming device for the wire electric discharge machine capable of arbitrarily setting a fixing position, when fixing the core to the work base material by attaching and depositing the machining debris to the machining groove.

Further, JP 2013-144335 A also discloses a machining program generating device of a wire electric discharge machine which sets an attachment region for attaching the components of the wire electrode from the shape and the weight of the core and generates a machining program on the basis thereof in order to prevent the drop of the core.

When adopting the method for fixing the core by the aforementioned core fixing function, the core is not always fixed. There was a problem of failure in fixing of the core to the workpiece for some reasons such as errors of various settings, changes in liquid quality of machining liquid, and aging variations of the wire electric discharge machine itself. For example, when a core 6 is not fixed and the core 6 is caught on a nozzle 5*a* as illustrated in FIG. 5B, if the nozzle 5*a* is moved in a right direction in such a state, there is a problem of damage to the nozzle 5*a* and the wire guide unit by interposing the core 6 between the nozzle 5*a* and the workpiece 3. Naturally, since it is not possible to perform the continuous machining, and repair of the machine is also necessary, a prolonged machine down occurs. Moreover, when a disconnection of the wire electrode occurs during machining, there is also a problem of breakage of the fixing portion at the time of returning to a breaking point after automatic wire connection. Due to this problem, some users of the wire electric discharge machine may not use the core fixing function for fear.

SUMMARY OF THE INVENTION

Accordingly, an object of the invention is to enable machining to be stopped when the core is no fixed, by checking whether the core is fixed in the machining using a core fixing function.

According to the invention, there is provided a wire electric discharge machine that has a core fixing function of fixing a core produced by electric discharge machining and a workpiece, by relatively moving a wire electrode and the workpiece in accordance with a machining program, by performing the electrode discharge machining of the workpiece by electric discharge generated between the wire electrode and the workpiece, and by attaching and depositing machining debris produced by the electric discharge machining to a machining groove. The wire electric discharge machine includes a core image acquiring means for acquiring an image of the core; a core fixing state determining means for determining whether the core is fixed from the image acquired by the core image acquiring means; and an electric discharge machining stop means for stopping the electric discharge machining, when the core fixing state determining means determines that the core is not fixed. The wire electric discharge machine performs machining, while checking a fixed state of the core.

In the wire electric discharge machine, the core fixing state determining means determines whether the core is fixed from the image, depending on whether a width of a machining groove surrounding the core formed by the electric discharge machining is constant or is within a predetermined tolerance range. Further, in the wire electric discharge machine, the core fixing state determining means determines whether the core is fixed from the image, depending on whether the adhesion and deposit of the machining debris produced by the electric discharge machining are present in the machining groove. Further, in the wire electric discharge machine, the core fixing state determining means determines whether the core is fixed from the image, by a difference in states of the surface light between the core and the workpiece.

In the wire electric discharge machine, the core fixing state determining means determines whether the core is fixed, from the image obtained by the core image acquiring means, at a stage in which machining is completed to the end point of a machining path for cutting the core or at a stage in which fixing machining of the core fixing function is completed.

In the wire electric discharge machine, the core image acquiring means is movable by mounting the core image acquiring means on a robot.

The invention allows safe continuous machining since machining proceeds by checking the fixing of the core. Further, by the invention, when the core is dropped without being fixed, since machining is stopped, it is possible to prevent breakage of a nozzle and a wire guide unit.

BRIEF DESCRIPTION OF THE DRAWINGS

Aforementioned and other objects and features of the invention will become apparent from the following description of embodiments thereof with reference to the accompanying drawings. In the drawings.

DETAILED DESCRIPTION OF THE PREFERRED EMBODIMENTS

Hereinafter, an embodiment of the invention will be described in conjunction with the accompanying drawings.

The invention is provided with a checking means for checking that the core is fixed to the workpiece, and as the checking means, a core image acquiring means such as a visual sensor or an image pickup device is included.

Figure 1:
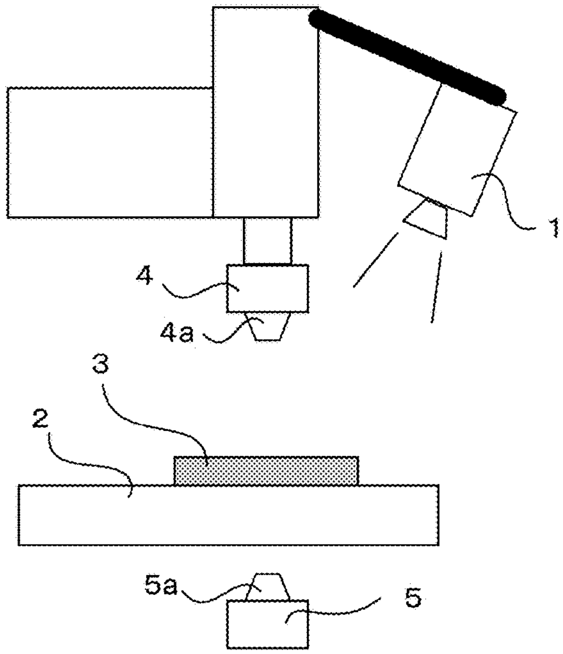
FIG. 1 is a schematic diagram of an embodiment of the invention.

FIG. 1 is a schematic diagram of an embodiment of the invention. A core image acquiring means 1 constituted of a visual sensor or an image pickup device is mounted at a position such as an upper guide unit 4 of the wire electric discharge machine where the core image acquiring means 1 looks down a table 2 with a workpiece 3 placed thereon. The core image acquiring means 1 is mounted above the upper guide unit 4 in the embodiment illustrated in FIG. 1. Further, the core image acquiring means 1 is configured to be connected to a control unit (not illustrated) which controls the wire electric discharge machine and to acquire an image of the workpiece 3 by a command from the control unit, and sent the image to the control unit. In addition, reference numeral 4*a* is an upper nozzle, reference numeral 5*a* is a lower nozzle, and reference numeral 5 is a lower guide unit.

Figure 2:
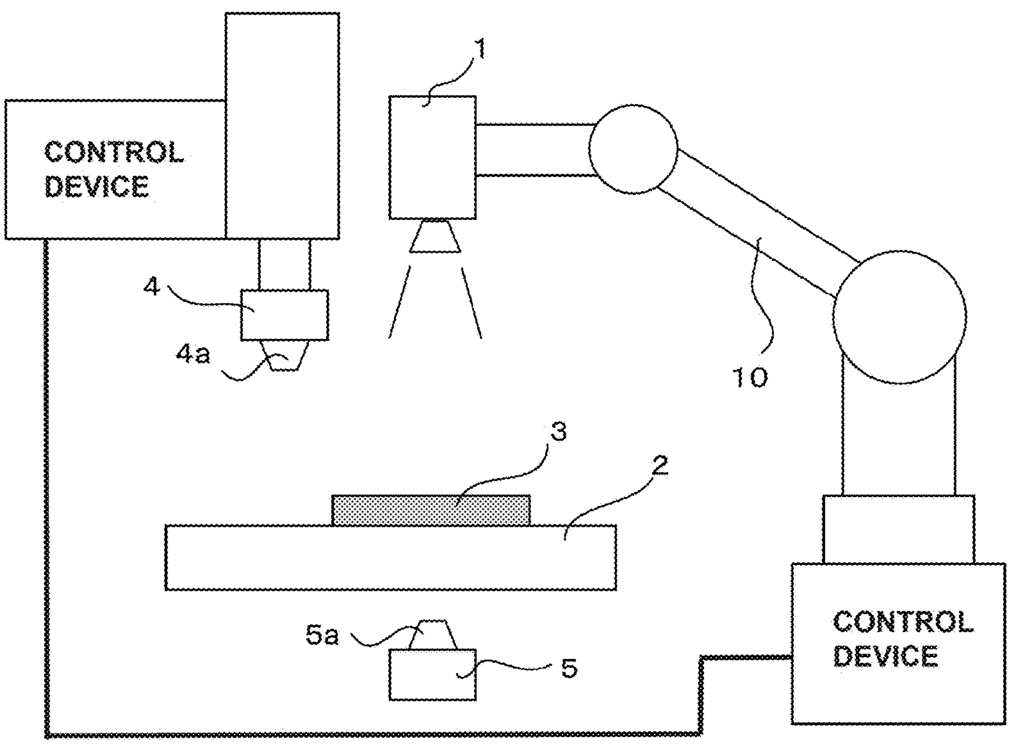
FIG. 2 is a schematic diagram of another embodiment of the invention.

FIG. 2 is a schematic diagram of another embodiment of the invention, and the core image acquiring means 1 is attached to a robot 10. Further, a control device of the robot 10 is connected to a control device (not illustrated) of the wire electric discharge machine. In the case of this embodiment, when acquiring the core image, the upper guide unit 4 is retreated, the robot 10 is driven, and the core image acquiring means 1 is moved to the core image acquiring position commanded by the machining program to acquire an image, or all the middle and rear image data previously registered are picked up by looking for a core position by the core image acquiring means.

The invention determines the fixed state of the core based on the image acquired in the core image acquiring means 1. As a determining method, there are methods of determining whether a machining groove width is constant, whether there are adhesion and deposition (fixing portion) of the machining debris in the machining groove, or whether there is a difference in the reflection statuses of light of the surface between the core and the workpiece.

1) A core fixing state determining method depending on whether the machining groove width is constant.

FIG. 3 is an explanatory diagram for determining the core fixing state from the width of machining groove, from the image acquired by the core image acquiring means 1.

Figure 3A:
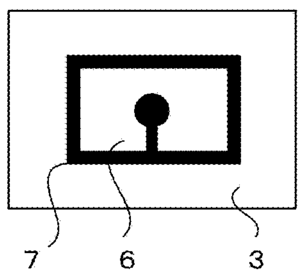
FIG. 3A is an explanatory diagram for determining a core fixing state from an image in which a width of a machining groove is kept constant.
Figure 3B:
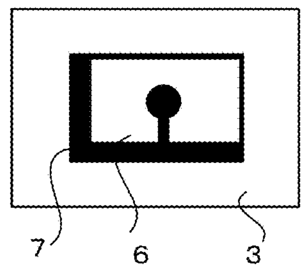
FIG. 3B is an explanatory diagram for determining a core fixing state from the image in which the width of the machining groove is not constant.
Figure 3C:
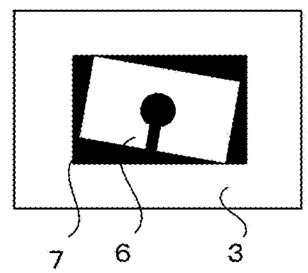
FIG. 3C is an explanatory diagram for determining a core fixing state from another image in which the width of the machining groove is not constant.

The machining groove width produced by the wire electric discharge machining is substantially constant in accordance with the wire diameter, and falls within a predetermined permissible range. Therefore, as long as the core 6 is fixed by the core fixing function even after the cutting of the core is completed, the image acquired by the core image acquiring means 1 becomes an image in which the width of the machining groove 7 is kept constant as illustrated in FIG. 3A. On the other hand, when the core 6 is not fixed, since the core 6 is cut off, in the image acquired by the core image acquiring means 1, the width of the machining groove 7 is not constant as illustrated in FIGS. 3B and 3C. Therefore, it is possible to determine the core fixing state, depending on whether the machining groove width from the image acquired by the core image acquiring means 1 falls within the determined allowable range.

2) A core fixing state determining method depending on whether there is a fixing portion in the machining groove.

Figure 4A:
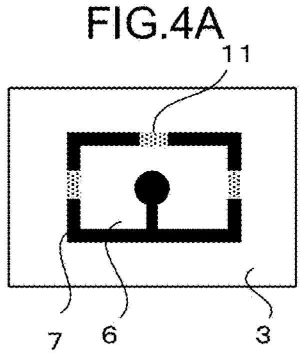
FIG. 4A is an explanatory diagram for determining a core fixing state by an image that has a fixing portion in the machining groove.
Figure 4B:
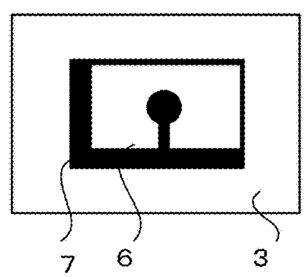
FIG. 4B is an explanatory diagram for determining a core fixing state by an image that does not have a fixing portion in the machining groove.
Figure 4C:
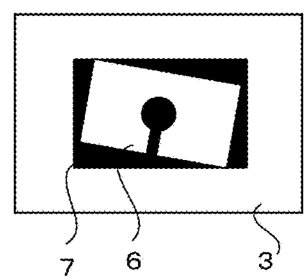
FIG. 4C is an explanatory diagram for determining the core fixing state of another image that does not have a fixing portion in the machining groove.

The core fixing function is intended to fix the core, by attaching and depositing the machining debris in the machining groove. Therefore, in the image acquired in the core image acquiring means 1, when the core 6 is connected and fixed to the workpiece 3, as illustrated in FIG. 4A, an image in which the adhesion and deposition (fixing portion) 11 of the machining debris are present in the machining groove 7 is obtained. On the other hand, when the core 6 is not fixed, since the core 6 is cut off, as illustrated in FIGS. 4B and 4C, adhesion and deposition (fixing portion) of the machining debris do not exist, and the image cannot be obtained. Therefore, it is possible to determine the core fixing state, depending on whether there is a fixing portion in the machining groove from the image acquired by the core image acquiring means 1.

3) A core fixing state determining method according to a difference in the reflection status of light of surfaces between the core and the workpiece.

Figure 5A:
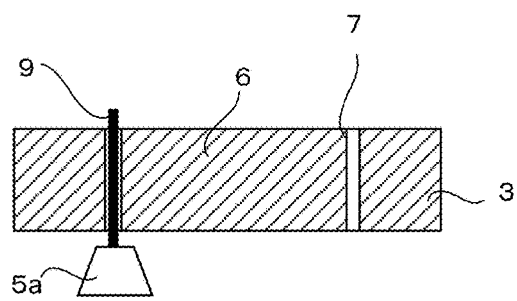
FIG. 5A is a diagram illustrating a fixed state of the core.
Figure 5B:
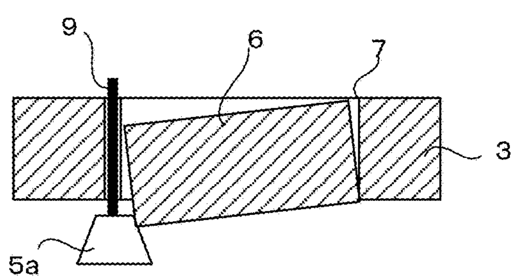
FIG. 5B is a diagram illustrating a non-fixed state of the core.

If the core 6 is fixed to the workpiece 3, as illustrated in FIG. 5A, the surfaces of the core 6 and the workpiece 3 are present on the same plane, and the reflection statuses of light from both surfaces are the same. On the other hand, when the core 6 is not fixed, as illustrated in FIG. 5B, since the surfaces of the core 6 and the workpiece 3 are not present on the same plane, the reflection statuses of light from both surfaces are different from each other. FIG. 6 is an example illustrating the reflection statuses of light of the surfaces of the core and the workpiece of the image acquired in the core image acquiring means 1.

Figure 6A:
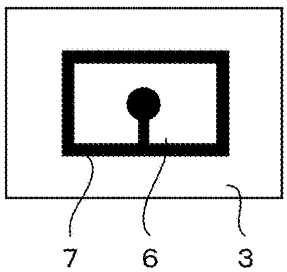
FIG. 6A is an explanatory diagram for determining a core fixing state from the state of the surface light of the core and the workpiece, illustrating a state in which the core is fixed, and the reflection statuses of light of the surfaces of the core and the workpiece are the same.
Figure 6B:
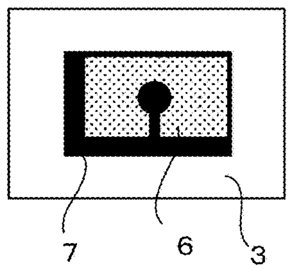
FIG. 6B is an explanatory diagram illustrating a state in which the core and the workpiece are not fixed, and the reflection statuses of light of the surfaces of the core and the workpiece are different.
Figure 6C:
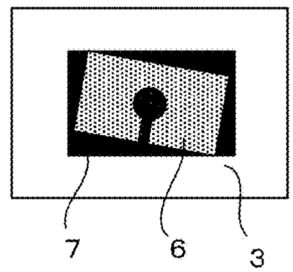
FIG. 6C is an explanatory diagram illustrating a state in which the core and the workpiece are not fixed, and the reflection statuses of light of the surfaces of the core and the workpiece are different.

FIG. 6A illustrates a state in which the core 6 is fixed and the reflection statuses of light of the surfaces of the core 6 and the workpiece 3 are the same. Further, FIGS. 6B and 6C illustrate a state in which the core 6 is not fixed and the reflection statuses of light of the surface of the core 6 and the workpiece 3 are different from each other. Therefore, it is possible to determine the fixed state of the core 6 by intensity or spectrum analysis of the surface light of the core 6 and the workpiece 3.

Figure 7A:
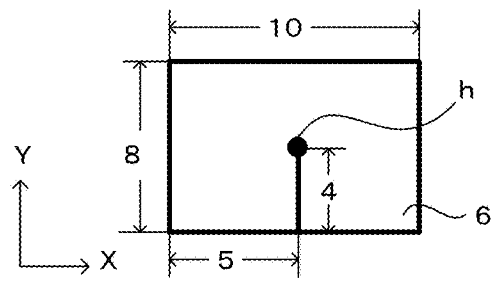
FIG. 7A is a diagram illustrating an example of the core.
Figure 7B:
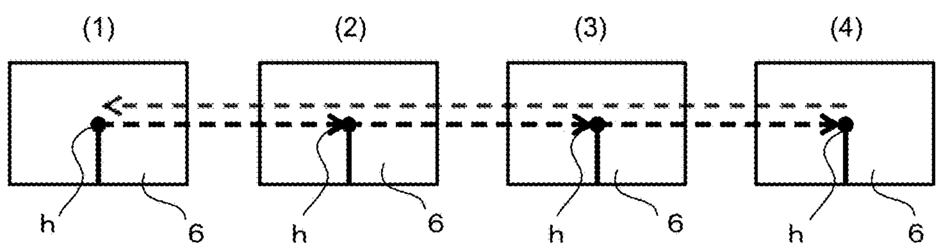
FIG. 7B is a diagram illustrating an example in which a plurality cores illustrated in FIG. 7A is machined.

Next, as illustrated in FIG. 7A, an example of machining the four rectangular cores 6 having a length of 10 in the X-axis direction and a length of 8 in the Y-axis direction, while fixing the cores in the order of (1)→(2)→(3)→(4) from the workpiece 3 as illustrated in FIG. 7B will be described. Further, a machining start hole h is machined at an intermediate position (positions of X=5, Y=4) of the length in the X-axis and Y-axis directions of the core 6, and the intervals of the cores 6 are 15.

The machining program for the machining is as follows.

<Main Program>

O2000;

S1D1; . . . 1st machining condition, offset setting

M98P200; . . . call sub-program 1

GOOX-45.0;

M00; . . . program stop

S2D2; . . . 2nd machining condition, offset setting M98P230; . . . call sub-program 3

GOOX-45.0;

S3D3; . . . 3rd machining condition, offset setting

M98P230; . . . call sub-program 3

M30;

<Sub-program 1>

O200;

M60; . . . wire connection

M98P220; . . . call sub-program 2 (machining of the core of (1))

M50; wire cutting

M123; . . . core fixing state determination

GOOX15.0;

M60; . . . wire connection

M98P220; . . . call sub-program 2 (machining of the core of (2))

M50; . . . wire cutting

M123; . . . core fixing state determination

GOOX15.0;

M60; . . . wire connection

M98P220; . . . call sub-program 2 (machining of the core of (3))

M50; . . . wire cutting

M123; . . . core fixing state determination

GOOX15.0;

M60; . . . wire connection

M98P220; . . . call sub-program 2 (machining of the core of (4))

M50; . . . wire cutting

M123; . . . core fixing state determination

M99;

<Sub-program 2>

O220;

G92X0.0Y0.0; . . . coordinate system setting

G91G01G42Y-4.0; . . . cutting feed (electric discharge machining section)

X-5.0; . . . cutting feed (electric discharge machining section)

Y8.0; . . . cutting feed (electric discharge machining section)

X10.0; . . . cutting feed (electric discharge machining section)

Y-8.0; . . . cutting feed (electric discharge machining section)

X-5.0; . . . cutting feed (electric discharge machining section)

G40Y4.0; . . . cutting feed (electric discharge machining section)

M99;

<Sub-program 3>

O230;

M60; . . . wire connection

M98P220; . . . call sub-program 2 (machining of the core of (1))

M50; . . . wire cutting

GOOX15.0;

M60; . . . wire connection

M98P220; . . . call sub-program 2 (machining of the core of (2))

M50; . . . wire cutting

GOOX15.0;

M60; . . . wire connection

M98P220; . . . call sub-program 2 (machining of the core of (3))

M50; . . . wire cutting

GOOX15.0;

M60; . . . wire connection

M98P220; . . . call sub-program 2 (machining of the core of (4))

M50; . . . wire cutting

M99;

In the main program (O2000), after the machining conditions of the 1st cut are set in the "S1D1", sub-program 1 (O200) is read in "M98P200". In the sub-program 1 (O200), the wire connection is commanded in "M60", and the sub-program 2 (0220) is called in "M98P220". In the sub-program 2 (0220), the coordinate system with the position of the machining start hole h of the core 6 of the current position (1) defined as origin is set in "G92X0.0Y0.0". In the command of "G91G01G42Y-4.0", by command of cutting feed (G01) of the incremental (G91) and the wire offset right (G42), the core moves by 4 in the Y-axis negative direction, next, moves by 5 in the X-axis negative direction, moves by 8 in the Y-axis positive direction, moves by 10 in the X-axis positive direction, moves by 8 in the Y-axis negative direction, and moves by 5 in the X-axis negative direction, and the wire offset is cancelled (G40), the core moves by 4 in the Y-axis positive direction, the core moves by Y−4, X−5, Y+8, X+10, Y−8, X−5 and Y+4 from the machining start hole h of the core 6 of (1), the electric discharge machining is performed while fixing the core, and the core returns to the position of the machining start hole h.

Further, by the command of "M99", the program returns to the sub-program 1 (O200) from the sub-program 2 (0220), the wire is cut in the "M50" of the sub-program 1 (O200), by the command of "M123", the determination process of the core fixing state (this process will be described later) is performed, and when the core is determined to be fixed, by the command "GOOX15.0", the core is positioned by being moved by 15 in the X-axis direction.

That is, the core is positioned at the position of the machining start hole h of the core 6 of (2), the same machining as in the machining of the core 6 of (1) is performed, and the machining of the core 6 of (2), (3) and (4) are sequentially performed. Further, the program returns to the main program (O2000) in "M99", and in the main program (O2000), by the positioning command of "G00X-45.0", the core is moved by 45 in the X-axis negative direction from the machining start hole h of the core 6 of (4) and is located at the position of the machining start hole h of the core 6 of (1), and the four cores 6 are machined as illustrated in FIG. 7. Further, after completion of the 1st cut, at the time point at which "M00" is commanded and the program operation is stopped, the core 6 is removed by an operator who applies an external force using a hammer, the 2nd cut and the finish machining of the 3rd cut are performed in accordance with the sub-program 3 (0230).

Figure 8:
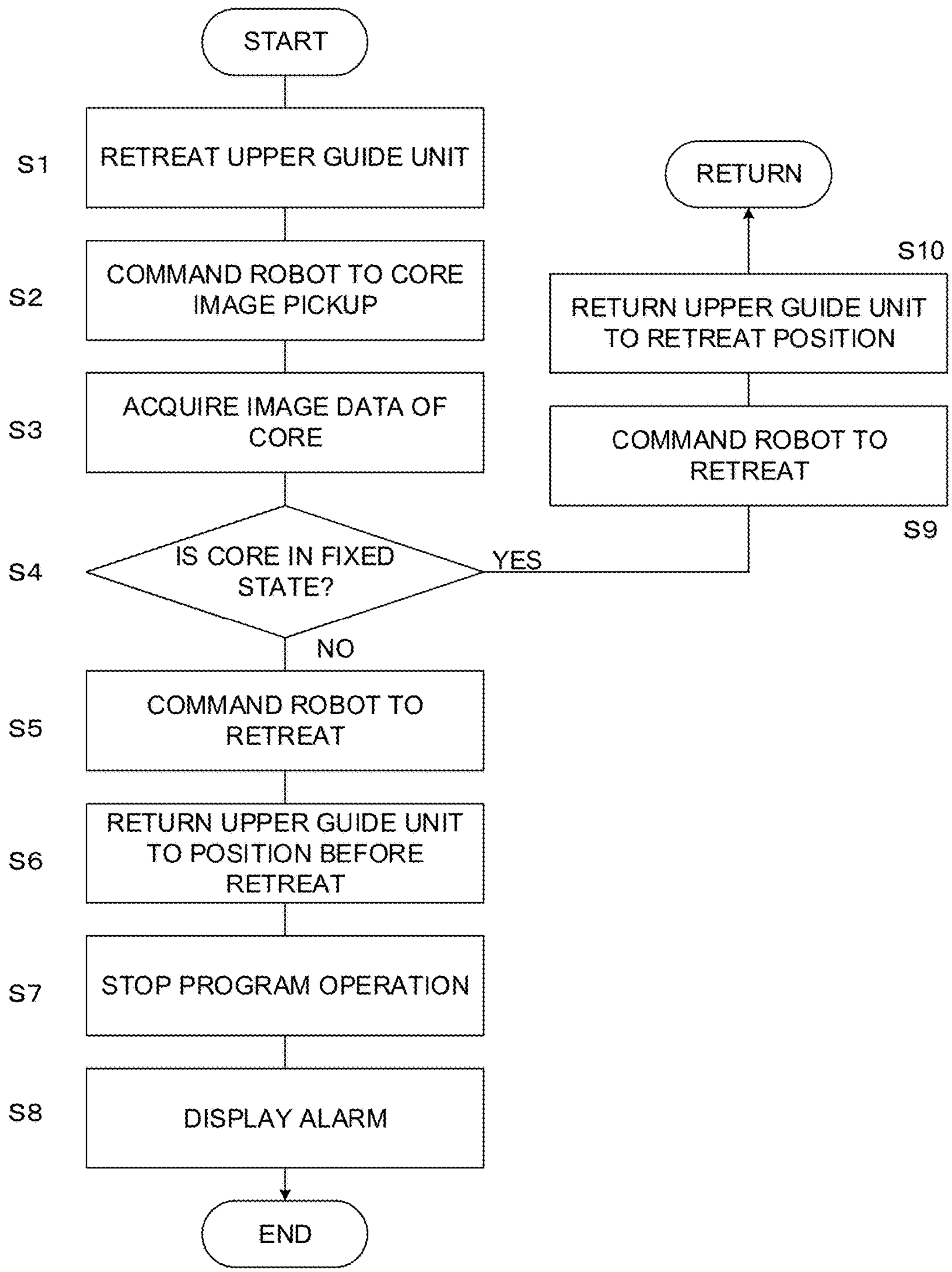
FIG. 8 is a flowchart illustrating an algorithm of a core fixing state determination process performed by a processor of a control device of a wire electric discharge machine.

If the core fixing state determination command of "M123" is issued in the aforementioned machining program, the processor of the control device (not illustrated) of the wire electric discharge machine starts the process illustrated in FIG. 8.

The process illustrated in FIG. 8 illustrates the process when the core image acquiring means 1 is mounted on a robot as illustrated in FIG. 2. Therefore, by the M123 command, first, in step S1, the upper guide unit is retreated (since the wire is already cut by the command of "M50", it is movable), and next, the image pickup command is output to the control device of the robot 10 (step S2). The control device of the robot 10 performs image pickup aimed at the coordinate position (the position of the machining start hole h) commanded in the coordinate system setting of G92 in the machining program, by moving the core image acquiring means. Alternatively, the image is picked up by finding the position of the core using the core image acquiring means based on the image data of the core which has been previously registered. Further, the picked up image is sent to the control device of the wire electric discharge machine.

The control device of the wire electric discharge machine acquires the sent image data of the core (step S3), and by one of the aforementioned three methods (determination whether the machining groove width is constant, determination whether adhesion and deposition of the machining debris are present in the machining groove, and the determination depending on the reflection status of light on the surfaces of the core and the workpiece), it is determined whether the core is fixed (step S4).

When the core is determined to be fixed, the retreat command of the core image acquiring means 1 to the control device of the robot 10 is output (step S9), the core image acquiring means 1 is retreated to the retreated position by the robot 10, thereafter, the guide returns to the position before the retreat (step S10), the process of the M123 command is completed, the program returns to the original sub-program 1, and the program operation after the M123 command is resumed.

On the other hand, when the core is determined not to be fixed in step S4, a retreat command of the core image acquiring means 1 to the control device of the robot 10 is output (step S5), the core image acquiring means 1 is retreated to the retreat position, and thereafter, the upper guide returns to the position before retreat (step S6), and the program operation is stopped (step S7), the alarm display is performed (step S8), and the electric discharge machining is stopped and completed.

Further, although an example of commanding the core fixing state determination using the core fixing state determining code such as "M123" has been illustrated in the aforementioned embodiment, even without providing a dedicated M code, when using the core fixing function, the process similar to the aforementioned process of FIG. 8 may be performed after the wire cutting of the M50 command.

Further, although the process illustrated in FIG. 8 is a process when attaching the core image acquiring means 1 as illustrated in FIG. 2 to the robot, when the core image acquiring means 1 as illustrated in FIG. 1 is mounted at a position such as an upper guide unit 4 where the core image acquiring means 1 looks down at the table 2 with the workpiece 3 mounted thereon, there is also no need for process of retreat of the upper guide unit of the steps S1, S6 and S10 and returning to the position before the retreat, and there is also no need for a retreat process (a retreat command to the robot) of the core image acquiring means of steps S5 and S9. Further, the image pickup command of step S2 may be output to the core image acquiring means 1, rather than the robot 10. Further, as illustrated in FIG. 1, when the core image acquiring means 1 is mounted at a position where the core image acquiring means 1 looks down at the table 2 with the workpiece 3 placed thereon, since it is possible to always obtain an image of the core 6, when the fixing process using the core fixing function is completed, the image pickup command is output to the core image acquiring means 1, the image is picked up, and it is determined whether the core is fixed from the obtained image, and if the core is determined to be fixed, the process is continued, and if the core is determined not to be fixed, the process is stopped and the alarm display may be issued.

As described above, in the embodiment, in the wire electric discharge machining performed while fixing the core using the core fixing function, since it is possible to check whether the core is fixed, the machining can be safely performed.

While exemplary embodiments of the invention have been described above, the invention is not limited to the example of the aforementioned embodiments, and the invention can be implemented in other embodiments by adding appropriate changes.

The invention claimed is:

1. A wire electric discharge machine having a core fixing function of fixing a core produced by electric discharge machining and a workpiece, by relatively moving a wire electrode and the workpiece in accordance with a machining program, by performing the electrode discharge machining of the workpiece by the electric discharge generated between the wire electrode and the workpiece, and by attaching and depositing machining debris produced by the electric discharge machining to a machining groove, the wire electric discharge machine comprising: a core image acquiring unit for acquiring an image of the core; and a control device connected to the core imaging unit, and having a processor configured to determine whether the core is fixed from the image acquired by the core imaging unit; and stop the electric discharge machining, when the processor determines that the core is not fixed;

wherein the processor is configured to determine whether the core is fixed from the image, depending on whether a width of a machining groove surrounding the core formed by the electric discharge machining is constant or is within a predetermined tolerance range.

2. The wire electric discharge machine of claim 1, further comprising:

a robot on which the core image acquiring unit is mounted, the robot configured to move the core image acquiring unit.

3. The wire electric discharge machine of claim 1, wherein the core image acquiring unit is mounted on an upper guide of the wire electric discharge machine.

4. A wire electric discharge machine having a core fixing function of fixing a core produced by electric discharge machining and a workpiece, by relatively moving a wire electrode and the workpiece in accordance with a machining program, by performing the electrode discharge machining of the workpiece by the electric discharge generated between the wire electrode and the workpiece, and by attaching and depositing machining debris produced by the electric discharge machining to a machining groove, the wire electric discharge machine comprising: a core image acquiring unit for acquiring an image of the core; and a control device connected to the core imaging unit, and having a processor configured to determine whether the core is fixed from the image acquired by the core imaging unit; and stop the electric discharge machining, when the processor determines that the core is not fixed;

wherein the processor is configured to determine whether the core is fixed from the image, depending on whether the adhesion and deposition of the machining debris produced by the electric discharge machining are present in the machining groove.

5. The wire electric discharge machine of claim 4, wherein the core image acquiring unit is mounted on an upper guide of the wire electric discharge machine.

6. A wire electric discharge machine having a core fixing function of fixing a core produced by electric discharge machining and a workpiece, by relatively moving a wire electrode and the workpiece in accordance with a machining program, by performing the electrode discharge machining of the workpiece by the electric discharge generated between the wire electrode and the workpiece, and by attaching and depositing machining debris produced by the electric discharge machining to a machining groove, the wire electric discharge machine comprising: a core image acquiring unit for acquiring an image of the core; and a control device connected to the core imaging unit, and having a processor configured to determine whether the core is fixed from the image acquired by the core imaging unit; and stop the electric discharge machining, when the processor determines that the core is not fixed;

wherein the processor is configured to determine whether the core is fixed, by a difference in states of the surface light between the core and the workpiece, from the image.

7. The wire electric discharge machine of claim 6, wherein the core image acquiring unit is mounted on an upper guide of the wire electric discharge machine.

8. A wire electric discharge machine having a core fixing function of fixing a core produced by electric discharge machining and a workpiece, by relatively moving a wire electrode and the workpiece in accordance with a machining program, by performing the electrode discharge machining of the workpiece by the electric discharge generated between the wire electrode and the workpiece, and by attaching and depositing machining debris produced by the electric discharge machining to a machining groove, the wire electric discharge machine comprising: a core image acquiring unit for acquiring an image of the core; and a control device connected to the core imaging unit, and having a processor configured to determine whether the core is fixed from the image acquired by the core imaging unit; and stop the electric discharge machining, when the processor determines that the core is not fixed;

wherein the processor is configured to determine whether the core is fixed, from the image obtained by the core image acquiring unit, at a stage in which machining is completed to the end point of a machining path for cutting the core or at a stage in which fixing machining of the core fixing function is completed.

9. The wire electric discharge machine of claim 8, wherein the core image acquiring unit is mounted on an upper guide of the wire electric discharge machine.

* * * * *